United States Patent [19]

Burcaw, Jr et al.

[11] 4,108,735
[45] Aug. 22, 1978

[54] METHOD FOR IMPROVED DISTILLATION OF AMMONIA FROM WEAK AMMONIA LIQUOR

[75] Inventors: Kenneth R. Burcaw, Jr, Easton; Daniel Kwasnoski, Hellertown; Eugene M. Rudzki, Bethlehem, all of Pa.

[73] Assignee: Bethlehem Steel Corporation, Bethlehem, Pa.

[21] Appl. No.: 695,685

[22] Filed: Jun. 14, 1976

[51] Int. Cl.² ............................................... B01D 3/38
[52] U.S. Cl. ........................................ 203/7; 203/36; 203/96; 423/357
[58] Field of Search ................. 203/36, 33, 37, 7, 47, 203/96, 97, 95, 92, 93; 423/357, 356

[56] References Cited

U.S. PATENT DOCUMENTS

| | | | |
|---|---|---|---|
| 453,005 | 5/1891 | Holden | 202/158 |
| 1,943,345 | 1/1934 | Richardson | 423/357 |
| 2,156,843 | 5/1939 | Garrels et al. | 203/36 |
| 2,781,244 | 2/1957 | Hecklinger | 423/357 |
| 2,892,682 | 6/1959 | Svanoe | 423/357 |
| 3,278,423 | 10/1966 | Millar | 203/36 |
| 3,920,419 | 11/1975 | Schroeder et al. | 55/18 |

*Primary Examiner*—Wilbur L. Bascomb, Jr.
*Attorney, Agent, or Firm*—Joseph J. O'Keefe; Charles A. Wilkinson

[57] ABSTRACT

Fouling of an ammonia still, used for removal of ammonia from weak ammonia liquor derived from a coal coking operation, is alleviated by pre-precipitating insoluble calcium salts from the ammonia liquor by treatment of the liquor with lime prior to introduction into a single-leg still.

18 Claims, 3 Drawing Figures

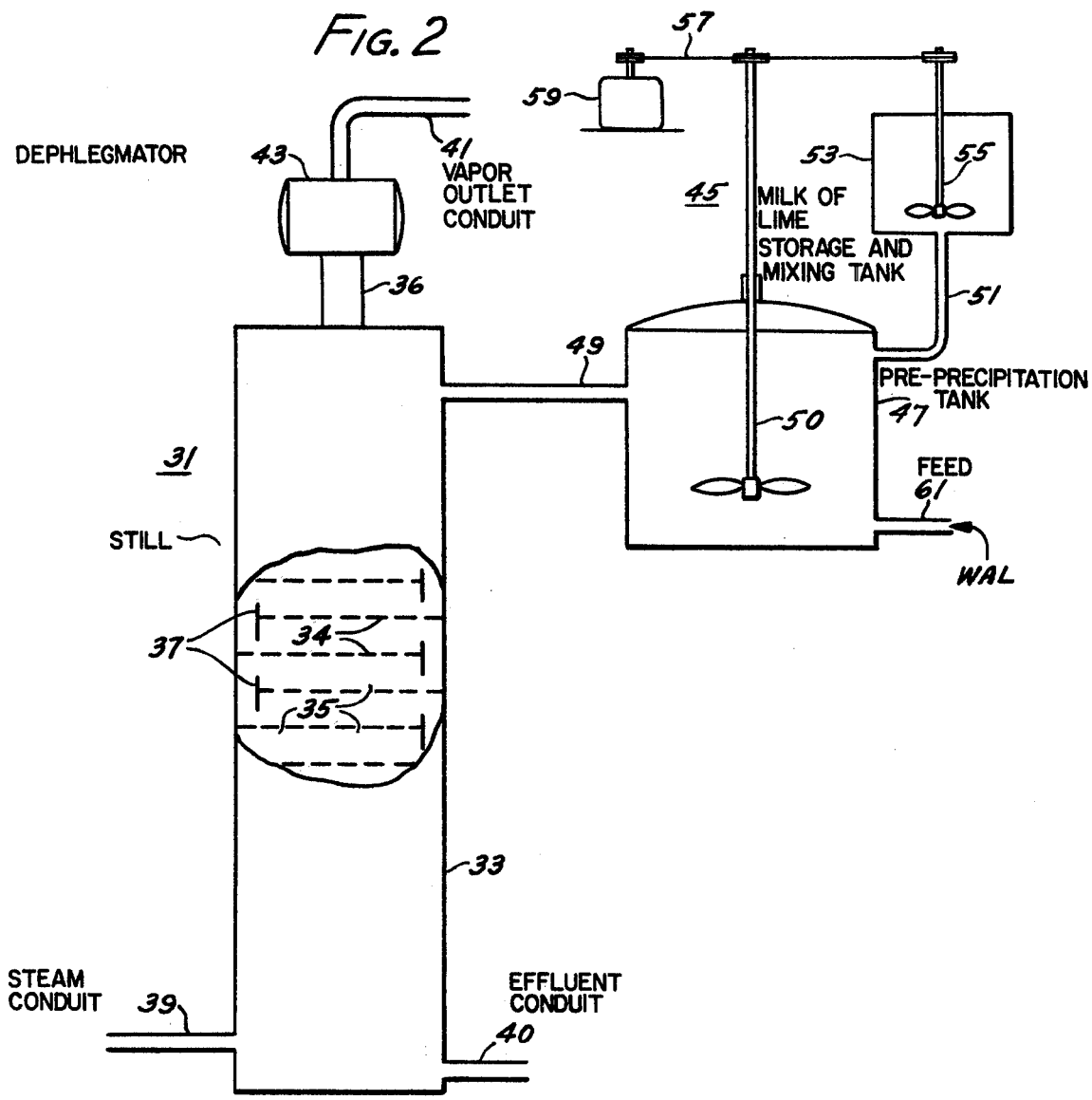

METHOD FOR IMPROVED DISTILLATION OF AMMONIA FROM WEAK AMMONIA LIQUOR

CROSS REFERENCES TO RELATED APPLICATIONS

This application is related to a copending application entitled "Improved Process for the Distillation of Weak Ammonia Liquor and Apparatus Therefor" filed concurrently with the present application by Danial Kwasnoski, Charles J. Sterner, Russel J. Horst and Kenneth R. Burcaw and assigned to the assignee of the present invention. The copending application discloses and claims an improvement of the invention disclosed herein.

BACKGROUND OF THE INVENTION

This invention relates generally to steam distillation of ammonia and ammonium ion compounds from aqueous solutions of such compounds and relates more particularly to the removal of ammonia from weak ammonia liquor produced during a coking operation.

The vapors given off during thermal decomposition of coal to produce coke for use in the steel industry contain various components including tars, light oils, phenols, naphthalenes, hydrogen cyanide, hydrogen sulfide, carbon dioxide, ammonia and water. These vapors are customarily initially cooled in a primary cooler. During such cooling the excess moisture condenses and absorbs ammonia, ammonium compounds and other lesser contaminants and is then known as weak ammonia liquor. The weak ammonia liquor, or WAL, may be recirculated through the primary cooler several times until the WAL becomes saturated with ammonia and other constituents and must be treated to remove the ammonia.

For perhaps as long as 100 years direct contact countercurrent steam stills have been used to remove ammonia from the weak ammonia liquor generated during the coking of coal. As is more fully described in the U.S. Steel publication, "The Making, Shaping and Treating of Steel", 9th ed., Harold E. McGannon, ed. (1971) pp 165 et seq, the most prevalent process for extracting ammonia from weak ammonia liquor is the Semi-direct Process. In this process, weak ammonia liquid is first stream distilled in a so-called "Free" leg to remove the "free", or thermally decomposable, ammonia, i.e. ammonium compounds which are readily dissociated by heat. Exemplary "free" ammonia compounds are ammonium carbonate, ammonium sulfide and ammonium cyanide, which compounds when decomposed, form ammonia and carbon dioxide, ammonia and hydrogen sulfide, and ammonia and hydrogen cyanide, respectively.

Following the first steam distillation in the free leg, the once distilled weak ammonia liquor is combined with an excess of an aqueous slurry of calcium hydroxide, or "milk of lime" in a "Lime" leg. By combination of the predistilled liquor with milk of lime slurry, the "fixed", or non-thermally decomposable, ammonium ion compounds contained in the liquor, i.e. ammonium chloride, ammonium thiocyanate and ammonium sulfate, are subjected to an alkaline environment where a chemical reaction takes place in which the ammonium ion is converted to ammonia and water. The resulting weak ammonia liquor-milk of lime (WAL-MOL) suspension or slurry, containing sufficient lime, both solid and dissolved, to give a CaO to $NH_4^+$ molar ratio of not less than 1:2, is then allowed to overflow into the "Fixed" leg of the ammonia still, where a direct contact countercurrent flow of steam extracts the hydrated ammonia from the descending liquor slurry. As the ammonia is driven from the descending WAL-MOL slurry, the equilibria present in the slurry, shown in equations I and II

$$Ca(OH_2) \rightleftharpoons Ca^{2+} + 2OH^- \qquad (I)$$

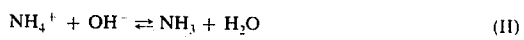
$$NH_4^+ + OH^- \rightleftharpoons NH_3 + H_2O \qquad (II)$$

are shifted to the right, with the result that solid Ca(OH$_2$) dissolves continuously as the liquor descends, and substantially all the ammonium ion present in the liquor is converted to ammonia and driven off.

The free and the fixed legs of the ammonia still are of similar construction and are each comprised of an upright column having internally disposed horizontal plates or trays. Each plate is equipped with gas-liquid contacting means through which ascending steam may pass. The gas-liquid contacting means are conventially either sieve holes or bubble cap assemblies.

In operation liquor enters the top of the still column and flows from tray to tray, either through downcomers in each plate or through dual flow sieve tray orifices, countercurrently with ascending steam and vapors to the bottom of the column where an effluent port allows the residual ammonia liquor, or so-called still bottoms, to be discharged to a storage vat prior to further processing.

The fixed leg and the free leg of a conventional ammonia still are normally interconnected in such a way that the stream introduced at the bottom of the fixed leg, passes directly from the top of the fixed leg to the bottom of the free leg and upwardly to the top of the still where the steam, along with entrained ammonia and acid gases, leaves the still. Once this steam/ammonia/acid gas stream leaves the top of the free leg, it may be routed to a dephlegmator to condense a portion of the steam and thence either to a sulfuric acid saturator to produce ammonium sulfate or to an incinerator for the combustive destruction of the gases.

One major drawback in the use of such a conventional ammonia still is the tendency of the distillation column to become plugged or fouled. Once a column has been in operation for a period of time, solid calcium compounds tend to accumulate in and around the gas-liquid contacting means, i.e. the bubble caps or sieve tray openings, thereby restricting and eventualy interrupting or interfering with upward flow of steam, particularly through the free leg. Such interruption or interference, of course, reduces the efficient intercontact of steam and liquor and therefore reduces the efficiency of ammonia removal from the liquor. When this occurs, the tower must be cleaned, a process which requires that it be taken out of service, dismantled and the calcium solids removed from the tray openings. Such removal is not only costly in man hours spent cleaning, but also necessitates either adequate storage facilities for the liquor accumulated during the still down-time or, alternatively, a duplication of ammonia still facilities whereby one facility may be used while the other is being cleaned.

Furthermore, since the still fairly rapidly becomes fouled or plugged between cleaning stages, the still is inevitably operated for a large percentge of the time between cleaning stages in a partially blocked condition. Ammonia stills for the distillation or stripping of weak ammonia liquor derived from coal coking operations have in the past, therefore, been designed with considerable excess capacity and with relatively low liquid to gas ratios. This is accomplished by designing the individual plates larger so that more total open area for passage of steam through the plates is available than would be necessary during unfouled operation. The increased open area is provided to insure the passage of adequate steam for efficient stripping of ammonia from the liquor at all times, both when the column is clean and when the column is partially fouled. This arrangement, however, results in relatively more steam overall being required for operation of the still, with a consequent high consumption of steam compared to that which would be required if the still were designed only for that amount of steam which is required for efficient stripping during unfouled operation. In other words, if no fouling and plugging occurred, a still could be designed for the relative passage of less steam per amount of liquor passed through the still. In most cases this would mean that the still would require a lesser diameter with respect either to its height, or more particularly with respect to its rated liquor throughput or capacity, because the total surface area of each tray or plate could be reduced. The usual molar liquid/gas ratio in conventional ammonia stills is in the range of 3 to 5.

One solution to the fouling problem is described in the March, 1975 issued of I&SM in an article by A. C. Naso and J. W. Schroeder entitled "A New Method of Treating Coke Plant Waste Waters", beginning at page 34. In their process, caustic soda is substituted for milk of lime and is added to the liquor prior to distillation. By this substitution, calcium ions are eliminated entirely from the process, thereby obviating the problem of calcium solids formation in the still. While such a solution is effective in eliminating column fouling, the cost of caustic soda as compared with that of lime renders the use of such a process economically unsatisfactory. Although the authors of this article claim that their process can be made economically feasible, this cannot be accomplished without extensive replacement or redeisgn of existing ammonia still equipment.

In light of the foregoing, there exists a need for a process which will eliminate the problems associated with free leg fouling and which will do so economically.

SUMMARY OF THE INVENTION

The fouling and plugging problems which have plagued prior art ammonia stills have been obviated by this invention. The present inventors have discovered the heretofore unrecognized fact that the fouling of an ammonia still occurs by two separate and distinct mechanisms. The present application is concerned with alleviation of the primary fouling mechanism, and the secondary fouling mechanism is the subject of the commonly assigned copending application entitled "Improved Process for the Distillation of Weak Ammonia Liquor and Apparatus Therefor" referred to above under the heading "Cross References to Related Applications".

The present inventors have discovered the heretofore unrecognized fact that the primary fouling problem in conventional ammonia stills occurs not randomly throughout the still column, but is restricted to the lower plates or trays of the free leg. This discovery, plus an analysis of the calcium solids found on these trays, resulted in the determination that primary fouling in an ammonia still is caused not by the deposition of solids derived from the solid components of the WAL-MOL slurry in the fixed leg, but rather is caused by the rection of calcium ions entrained in the ascending steam with carbonate and fluoride and possibly other ions present in the weak ammonia liquor in the bottom portion of the free leg. Since the two media, i.e. ascending steam and descending liquor, are intimately mixed at the individual gas-liquid contact means at each plate, reaction between the calcium ions and carbonate and fluoride ions takes place at these locations and the resulting solid calcium compounds tend to gradually, and in many cases rapidly, plug the internal orifices of the still column. Thus, the orifices become increasingly more fouled over a period of time until full blockage occurs.

The present inventors have discovered that this fouling, which occurs in the lower trays of the free leg in a conventional ammonia still, may be eliminated by subjecting the incoming weak ammonia liquor to a preliminary precipitation, or pre-precipitation, with calcium hydroxide prior to entrance into the ammonia still proper. In effect the weak ammonis liquor is treated in a lime leg prior to, rather than as an intermediate step during, steam distillation. This treatment results in the precipitation of insoluble calcium salts prior to distillation. Such "preprecipitation" essentially reduces the fluoride and carbonate ion concentrations in the weak ammonia liquor to the point where their calcium salts will not precipitate during distillation.

It has been further found that such pre-precipitation may be accomplished with no attendant increase in either still column height or steam consumption in order to produce the same quality effluent.

It has further been found that the total steam consumption of a still may be very significantly decreased by the use of such pre-precipitation if the still is designed with a higher liquid to gas flow ratio than has been customary in the past. The molar liquid/gas ratio should be in a range of from 5 to 10 and preferably a range of from 6 to 9.

In accordance with the present invention, weak ammonia liquor is initially passed into a milk of lime mixing chamber where it is combined with sufficient milk of lime to give a total calcium to ammonia molar ratio sufficient to free substantially all of the fixed ammonia in the liquor. It is preferable to maintain the pH of the mixing chamber effluent above about 10.6, or, more preferably, in a range of about 10.6 to 11. The WAL-MOL slurry is then passed into the top of an ammonia still column where it is directly contacted by a countercurrent flow of steam or other heated stripping gas. As a result of such treatment, ammonia is removed from the weak ammonia liquid by the ascending steam without the fouling of the still found in the conventional process.

BRIEF DESCRIPTION OF DRAWINGS

FIG. 2 is a diagrammatic representation of the apparatus necessary to accomplish the process of the present invention.

DESCRIPTION OF THE PREFERRED EMBODIMENT

The present invention resulted from the discovery of the heretofore unobvious fact that a great deal of the fouling of conventional ammonia stills is due to reactions occurring in the lower regions of the usual free leg of such stills. Calcium ions entrained in the steam entering the bottom of the free leg react with carbonate or fluoride ions contained in the weak ammonia liquor passing downwardly through the still to form solid calcium compounds which foul the portions of the still in which the reactions occur.

Figure 1:
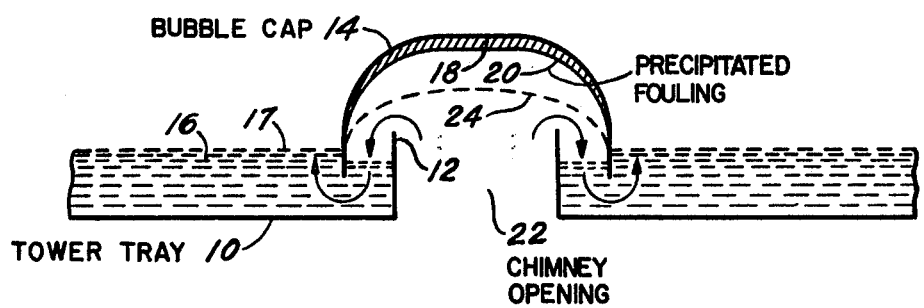
FIG. 1 is a cross-section of a bubble cap on a tray in the free leg of a conventionl ammonia still showing the type of fouling which would normally occur after a short period.

FIG. 1 shows an individual bubble cap, 14, with a chimney, 12, on a plate or tray, 10, in the free leg of a conventional ammonia still. Weak ammonia liquor, 16, flows along plate 10 at a level 17 which is above the lower lip of the bubble cap 14. The level 17 is determined usually by the height of weirs associated with downcomers, not shown, on other portions of the tray. Under the vigorous agitation caused by the steam passage between the bubble cap and chimney, a film of weak ammonia liquor, containing carbonate, sulfide, sulfate and fluoride ions, forms on the underside 18 of bubble cap 14. Steam containing small amounts of entrained lime-containing liquid enters chimney orifice, 22, and contacts the film of ammonia liquor resulting in a reaction between the calcium ions and the anions in the weak ammonia liquor and forming a precipitated layer of mixed calcium solids, 20, on the inside of the bubble cap. The lime-containing liquid particles entrained in the steam are very small liquid particles derived from the passage of the steam from under bubble caps or through sieve tray orifices in a prior fixed leg of the ammonia still. Over a period of operation, the layer of adherent precipitated solids, 20, gradually increases in thickness as shown by the dotted line 24 in FIG. 1 until it eventually bridges the gap between the chimney and the edge of the bubble cap and blocks normal steam passage through the gap.

Not only bubble caps but also the openings in other types of liquid-gas contact apparatus used in the free leg of ammonia stills are gradually blocked in the same manner. In the case of the use of a sieve tray the build-up may not be as rapid because there is inherently less solid surface present for the lime deposits to adhere to. Nevertheless a surprisingly rapid build-up does occur in a ring about the bottom edges of sieve tray perforations and the gas capacity of the perforations decreases as a result.

It has been necessary in prior ammonia stills for the stripping of weak ammonia liquor derived from the coking of coal to allow for the decreased passage of steam through the openings in the sieve trays or bubble caps by initially designing the still with more open area per tray in order to allow for subsequent partial blockage of the tray openings. The individual trays cannot merely be designed with larger openings because, particularly in a sieve tray arrangement, the size of the individual opening cannot be too lage without seriously interfering with intimte contact between the steam and liquor. More total open area in individual plates or trays must, therefor, be provided by increasing the number of orifices per tray, thus necessarily increasing the diameter and area of the individual trays in order to maintain an optimum spacing of orifices. Increasing the number of orifices in each tray very significantly increases the stream consumption of the still, especially in the unfouled state, because a certain minimum amount of steam is required to maintain an even flow and, particularly in a sieve tray arrangement, to prevent excessive flow of liquor through the openings. It has been customary to design the sieve trays with a molar L/G, or molar liquid to gas ratio, of about 3 to 5. The molar L/G ratio is a measure of the relative countercurrent flow of liquid and gas, i.e. vapor, and here steam vapor, through the still, flows being measured entering the still.

In order to combat the above described fouling reactions, the process of the present invention precipitates the calcium salts in the weak ammonia liquid prior to the introduction of such liquid into the still. This "pre-precipitation" is carried out preferably as shown in FIG. 2.

In FIG. 2 there is shown a single leg ammonia still 31 comprised of a containment shell 33 in which there are mounted a series of sieve trays 34 having sieve tray orifices 35 and overflow weirs 37 at alternate sides of the trays. A steam conduit 39 admits steam to the lower portion of the still 31 below the lowermost sieve tray, but above the level of still bottoms which collect in the lower part of the still column. The still bottoms exit from the still through effluent conduit 40. The still bottom effluent conduit 40 may pass to any appropriate still bottom treatment apparatus, not shown, or a holding tank or the like, also not shown, or may preferably pass to a heat exchanger arrangement where the heat contained in the still bottoms may be recovered and reused, preferably in the manner shown in a copending application entitled "Improved Method and Apparatus for Distillation" filed concurrently with the present application in the names of Danial Kwasnoski and Charles J. Sterner and assigned to the assignee of the present invention.

A vapor exhaust conduit 36 leads from the top of the still 31 to a conventional dephlegmator 43. A vapor outlet conduit 41 leads from the dephlegmator to some further treatment, not shown. The dephlegmator condensate returns to the still via the conduit 36. The outlet conduit 41 may lead conventionally in a coal coking operation to the coke gas stream derived from the coking operation prior to passage to the gas stream into ammonia absorption towers or saturators where ammonia is removed from the gas stream. Alternatively the ammonia and steam vapor passing from the still 31 via the outlet conduit 41 may be passed to any suitable separate ammonia recovery apparatus or ammonia destruct apparatus such as an incinerator apparatus.

Associated with the single leg ammonia still 31 is a preliminary precipitation apparatus, or pre-precipitation apparatus, indicated generally as 45 in FIG. 2. The pre-precipitation apparatus is comprised of a pre-precipitation and mixing chamber or tank 47 connected to the upper portion of the still 31 above the uppermost sieve tray by a still feed conduit 49. An agitator or mixer 51 may be provided in the tank 47. Milk of lime mixing and/or storage tank 53 is connected to the pre-precipitation and mixing tank 47 by a feed conduit 51. An agitator 55 may be provided in the tank 53 to either mix the milk of lime or to maintain the milk of lime in suspension if the tank 53 serves primarily as a storage tank. Milk of lime, or MOL, is a mixture of slaked lime, Ca-$(OH)_2$, and water. The agitators 50 and 55 in the pre-precipitation tank 47 and the mixing tank 53 respectively may desirably be rotated by means of a belt drive 57 from a motor 59. A vapor vent, not shown, may be provided in the top of the pre-precipitation chamber 47, but will usually not be necessary because the vapor pressure of ammonia is not high until the MOL-WAL mixture is heated. A MOL-WAL feed conduit, or still feed conduit, 49 leads from the pre-precipitation chamber 47 to the upper portion of the still 31 above the uppermost tray.

Referring to FIG. 2, during operation weak ammonia liquor is introduced into the pre-precipitation and mixing chamber 47 through weak ammonia liquor feed inlet 61 and is intimately mixed by aditator 50 with a milk of lime slurry introduced into pre-precipitation chamber 47 from milk of lime mixing and/or storage tank 53 through milk of lime feed conduit 51. As the milk of lime is mixed with the weak ammonia liquor the calcium ions in the milk of lime reacts with anions in the liquor to form calcium compounds. A small excess of lime is preferably used so that all precipitatable lime compounds are precipitated in chamber 47 prior to the passage of the liquor through line 49 into the still 31.

The mixed weak ammonia liquor/milk of lime (WAL/MOL) slurry level rises as additional reactants are added until the mixture overflows from mixing chamber 47, through still feed conduit 49, into ammonia still 31. The WAL/MOL mixture enters ammonia still 31 and flows onto the first of a series of sieve trays 34 having a surface area including perforations constituting approximately ninety percent of the cross-sectional area of the column. About ten percent of the active area of each tray, i.e. the area of each tray available for perforations, is taken up by such perforations. Overflow weirs 37 are positioned at the ends of the plates adjacent the remaining ten percent of column cross-sectional area — not the active area of tray — which is open. This open column area at each tray level forms a downcomer which allows the weak ammonia liquor/milk of lime slurry to descend from tray to tray. The open downcomer areas of consecutive trays are positioned on opposite sides of the column thus requiring the descending slurry to travere the full length of the tray before descending to the next lower level. Alternatively, a dual flow sieve tray in which both gas or vapor and liquor flow countercurrently through the sieve tray openings may be used.

Steam, or steam mixed with other hot gases, is introduced into the ammonia still below the level of the lowest sieve tray through steam inlet conduit 39. The steam passes upwardly through the still through sieve tray orifices 35 in the various successive trays, intimately contacting the descending slurry and stripping or volatilizing a portion of the ammonia contained therein. As the steam continues its ascent, it becomes mixed with progressively greater concentrations of ammonia vapor at each tray level. The steam/ammonia stream finally exits from ammonia still 31 through vapor exhaust conduit 36 and vapor outlet conduit 41.

The WAL/lime, or WAL/MOL, slurry descends through the column from tray to tray until it passes from the lowest tray and accumulates in the bottom of the still column from which it is removed to a suitable storage vat or the like through still bottoms effluent conduit 40 prior to further treatment.

The steam/ammonia stream which passes through vapor exhaust conduit 36 has a high moisture content. For this reason, the stream is preferably, but not necessarily, routed through dephlegmator 43 in order to condense a portion of the steam and thereby increase the concentration of the ammonia in the stream.

The molar liquid to gas ratio of the still 31, which depends primarly upon the size and number of the orifices in the individual sieve trays, will be desirably maintained within a range of about 5 to 10 and preferably within a range of 6 to 9. Operating within this range of ratios there will be a sufficient quantity of steam and other vapor passing upwardly through the sieve tray perforations to prevent most of the WAL/lime mixture from passing downwardly through the orifices, but at the same time not so much that good stripping contact between the liquor-slurry mixture and the steam is not maintained.

Insoluble calcium compounds are precipitated from the WAL/lime mixture prior to entering the still proper. Consequently these compounds are not precipitated out in adherent layers within the still itself and do not tend to foul and block the seive perforations. Such precipitation fouling was, as explained supra, particularly prevalent in the lower portions of the free leg of prior conventional ammonia stills.

While the pre-precipitated calcium solids do become a part of the WAl-MOL slurry which flows through the still, the slurry tends to flow smoothly through the still column from tray to tray without building up adherent deposits of precipitated solids. With sufficient liquor flow through the still it is even possible to use bubble cap type gas-liquid contact means such as shown in FIG. 1 in the various trays. Since there is a possibility, however, of a sedimentary type sludging or build-up throughout the trays, it is preferable to use sieve type trays because the less restricted liquid flow pattern in such trays decreases sedimentary type sludging. However, if the pre-precipitation step is combined with a succeeding liquor clarification step in which the solid particles are removed from the liquid portion of the slurry and the clarified liquor is then passed into the still column, it may be preferable to use bubble cap type or even other types of gas-liquid contact apparatus which provide more intimate and efficient contact between the liquor and the steam. Clarification of the liquor may be accomplished by passing the WAL-MOL slurry through a settling tank or the like. An improved pre-precipitation system which combines a clarification step with the pre-precipitation step and thus eliminates sedimentation type sludging as well as precipitation buildup within the still column is disclosed and claimed in the copending application entitled "Improved Process for the Distillation of Weak Ammonia Liquor and Apparatus" referred to above under the heading "Cross References to Related Applications". It will be understood, of course, that the pre-precpitation arrangement of the present invention can broadly be used either with or without the clarification of the pre-precipitated liquor described in the copending application.

Since actual precipitation of calcium solids in the still column, particularly around the openings in the trays, is completely eliminated by the pre-precipitation step of the present invention, deleterious fouling of the still column is very considerably alleviated and the still can as a consequence operate for long periods with minimal blockage of the openings in the trays. It is consequently possible to design the still with a relatively high molar liquid to gas ratio as explained supra. The number of perforations in individual sieve trays can, for example, be decreased thus decreasing the amount of steam necessary to maintain proper operation, particularly in the unfouled condition, and allowing the active area of the individual trays in the column to be decreased. Both capital and operating expenses are consequently minimized.

Figure 3:
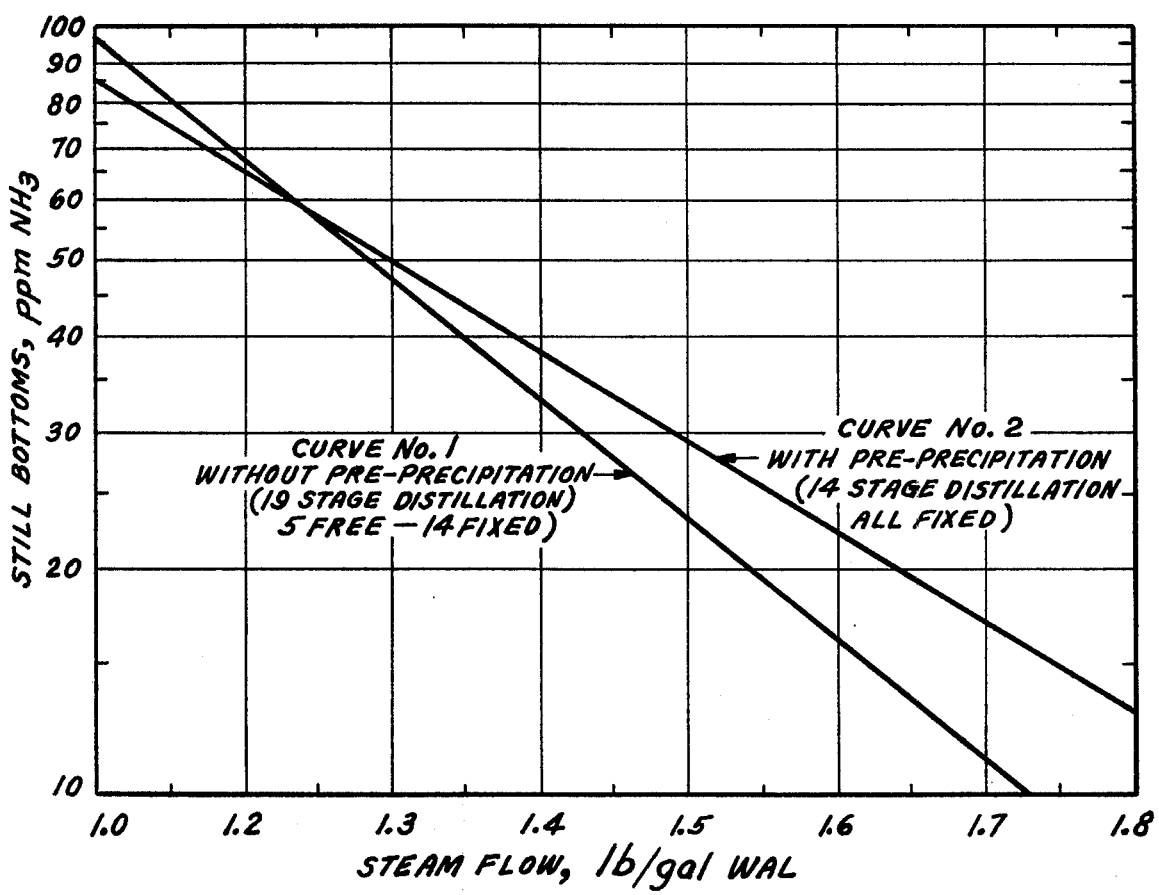
FIG. 3 is a graphic comparison of the amount of steam necessary to remove ammonia to a specific residual concentration in an experimental ammonia still operated both in the manner of a conventional ammonia still and a still operated in accordance with the present invention.

FIG. 3 is a graph with curves representing respectively the prior art method of operation of ammonia stills and the new pre-precipitation method of operation. The data upon which the curves are based was obtained using a substantially full scale experimental ammonia still constructed in accordance with the preferred parameters for stills designed for operation according to the present invention. In other words, the still was designed to achieve the most efficient operation possible in an unfouled condition. No oversizing to allow for progressive fouling was used in design and construction of the experimental still.

The experimental still column as constructed so that it could be operated either as a single-leg still with pre-precpitaton in accordance with this invention or as a two-leg still, i.e. with a free leg and fixed leg and an intermediate lime treatment, in accordance with the usual prior art still arrangements. The still was then operated experimentally, first following prior art practice, and second following the teaching of the present invention. There were 14 trays in the nominal fixed leg section of the still and 5 trays in the nominal free leg section of the still. Operating first with both the free leg and fixed leg sectons and an intermediate lime leg, Curve No. 1 was obtained by plotting the steam flow in pounds per gallon of WAL treated against parts per million of ammonia in the final still bottoms. Operating, second, with the free leg by-passed and with pre-precipitation prior to passage of the WAl-MOL slurry through the 14 trays of the nominal fixed leg (operating as the sole leg) Curve No. 2 was obtained.

It will be seen that the two curves overlap at 60 p.p.m. residual ammonia in the still bottoms at which point 1.23 pounds of steam per gallon of WAL was used in both cases. While operating in the conventional mode with both a free leg and a fixed leg proved more efficient when under 60 p.p.m. of residual ammonia was desired, it proved less efficient when more than 60 p.p.m. of residual ammonia was obtained. The efficiencies were fairly close in most ranges. This in itself was considered surprising considering that 5 less trays were used when operating with the preprecipitation mode of operation. Generally the more trays which are used the lower the residual ammonia which can be obtained. The data can easily be extrapolated to show that with the use of pre-precipitation and the full 19 trays the efficiency in steam use to obtain the same residual ammonia content would be substantially the same or even better in all ranges when using only a single leg. Thus the use of pre-precipitation clearly does not harm the ammonia stripping efficiency of the still column. The deciding factor, however, is that when operated in accordance with prior practice with a free leg and a fixed leg the still became completely plugged in most runs within 24 hours. When operating with pre-precipitation, however, the still ran for at least two weeks or more without significant fouling. While some sedimentary type fouling occurred, this fouling increased only slowly and was no serious problem. No precipitation fouling was detected.

While it is much preferred to pre-precipitate the weak ammonia liquor with an amount of lime sufficient to release all fixed ammonia from the weak ammonia liquor and subsequently pass the WAL-lime mixture into a single leg ammonia still as shown and described, and as contrasted to an ammonia still having both a free and a fixed leg, it is also possible with some loss of efficiency to pre-precipitate with a lesser amount of lime which is, however, sufficient to precipitate out most of the fluorides and carbonates, but not all of the anions in the WAL. Fluorides have been found by the present inventors to be of the most troublesome of anions so far as precipitation tye fouling is concerned. Calcium fluoride in particular has a very low solubility and thus tends to be preferentially precipitated as calcium is added to weak ammonia liquor. The addition of sufficient lime to precipitate the fluorides will, therefore, serve to remove the principal component of precipitation fouling. Removal of the fluorides and at least some of the carbonates from the WAL may be accomplished by pre-precipitation with a limited amount of lime or milk of lime in a pre-precipitation apparatus such as shown in FIG. 2 after which the WAL-lime mixture may be passed into a conventional ammonia distillation apparatus, i.e. two ammonia legs and an intermediate lime leg, such as shown in the U.S. Steel publication previously referred to.

Since an alkaline solution is not required until the fixed ammonia is to be freed, it is not always strictly mecessary to accomplish partial pre-precipitation with lime. For example, for partial pre-precipitaton an addition of calcium chloride or some other calcium compound other than lime may be used. Lime would then be added to free the fixed ammonia. In this way the benefits of the present invention so far as fouling are concerned may be attained using already existing equipment. Unfortunately the decreased steam benefits of the invention will not be attained with conventional equipment unless the molar liquid to gas ratio of the still is also changed.

As an alternative some older installations can be adapted to the present invention by bypassing the lime leg and directly interconnecting the free leg and the usual fixed leg to form a single leg. The bypassed lime leg may then be used as an initial pre-precipitation apparatus. Again, however, the improved steam consumption of the present invention will not be obtained unless the molar liquid to gas ratio is also changed by modifications of the individual tray stages.

It has been found when a complete pre-precipitation is carried out and the limed WAL is then passed through a single leg ammonia still that an optimum operating pH is required in the effluent from the mixing and pre-precipitation vessel. Such an optimum pH value of the effluent will provide both a minimum residual ammonia in the still bottoms and at the same time an optimum use of lime in the process. If the optimum pH is not attained, a low residual ammonia content will not be attained in the still bottoms, while if the optimum pH value is significantly exceeded more lime is used than is necessary. In other words, it has been found that when the pH value of the WAl-MOL suspension passing from the mixing and pre-precipitation chamber to the top of the single leg ammonia still is plotted against the residual ammonia remaining in the still bottom effluent after stripping, the residual ammonia values will rapidly decrease as the pH increases toward a limiting or optimum value after which the residual ammonia values decrease very slowly if at all as the pH continues to increase.

In one installation the optimum pH was found to be approximately 10.6. At a pH of 10.6 or greater the residual ammonia values were minimized, whilfe if the pH significantly exceeded this value the residual ammonia values remained low, but the amount of lime used was excessive and unnecessary.

It might at first be supposed that the pH would reach a maximum of about 12 in any event because of the content of solids in the WAL-MOL passing to the top of the still, at least where a clarification step is not used in combination with the pre-precipitation step of the invention. However, the pH can be controlled in the vicinity of the optimum value because a large part of the solids present, if an excess of lime is not originally used, will consist of substantially insoluble calcium precipitates. A practical operating range in one installation has been found to be from 10.6 to 11. If an automatic pH monitoring and control system is not used it may be desired to control the pH within a range of about 10.8 to 11 to make sure that a pH of at least 10.6 is maintained at all times. The excess pH does no real harm, but adds to the cost of operation. If a good pH monitoring and control system is available it will be desirable to maintain the pH on the high side of, but as close as possible to, the optimum value, or, in other words, in the example given, between about 10.6 and 10.8 or less.

It should be understood that the optimum or limiting value of 10.6 for the pH set forth is the optimum pH found for one particular weak ammonia liquor. Weak ammonia liquor derived from different coal coking operations may vary in composition and the optimum pH may also be either somewhat higher or somewhat lower. The same type of optimum or limiting value will be found in all cases, however, and can be easily established for any given weak ammonia liquor by a simple process of a trial and error once it is known that a limiting value is involved. To establish the optimum pH value any given distillation column or simulation thereof will be run using varying lime additions to attain a series of still feeds with varying pH while measuring the residual ammonia in the still bottoms. The varying pH's will then be plotted against the residual ammonia values to establish the optimum or limiting value for the pH. The pH of the installation should thereafter be operated with a pH of the WAL-MOL entering the still of from the optimum pH found, to about 0.4 of a pH unit above and preferably about 0.2 of a pH unit above the optimum value found. Previously it has always been considered that an excess of solid lime had to be maintained in the WAL-MOL in order to assure complete stripping of the ammonia from the WAL. Such an excess has usually resulted in a pH of 12 or more.

Several ammonia still installations have been designed in accordance with the principles of the present invention. As an example of a still constructed to take advantage of the invention and capable of treating 130 to 277 gallons per minute of WAL (492 to 1048 liters/min.), one of these stills incorporates a single leg with the following dimensions and specifications:

5 ft. inside diameter (1.52 meters)
60 ft. tall (approximately) (18.3 meters)
22 cross flow sieve trays
13.6 square feet of active area per tray (1.26 sq. meters)
1773 ⅜ inch dia. (0.95 cm.) perforatons per tray (10% of the active area)
Designed liquid/gas ratio of 6.6 (equivalent to a requirement of 1.4 pounds of steam per gallon of WAL) (168 grams/liter)

A conventional ammonia still of the same diameter would be capable of treating only approximately half the amount of WAL per any given time period as can be treated by the above still.

While a singe pre-precipitation and mixing chamber has been shown in FIG. 2, it will be understood that it may sometimes be desirable to make use of several chambers in series. For example, a preliminary mixing chamber of limited dimensions feeding into a second pre-precipitation chamber in which continued agitation and reaction is effected may be used. Various other apparatus arrangements will occur to those skilled in the art.

The lime, which preferably will be in the form of burnt lime or CaO, will usually be combined with the WAL as a milk of lime suspension, i.e. a $Ca(OH)_2$ suspension in water. However, the lime may also be mixed with the WAL in the form of a lime solution, i.e. a clear solution of $Ca(OH)_2$ in water commonly known as limewater, particularly when only a partial pre-precipitation is to be used, or as an alternative may be mixed directly from the solid state — preferably in a finely ground condition — with the WAL.

Commercial lime contains varying small percentages of magnesium as well as calcium. The magnesium reacts in a manner very similar to the calcium with anions in the WAL. Consequently the pre-precipitation of calcium compounds or salts will broadly include the co-precipitation of magnesium compounds as well. Such coprecipitation may be referred to broadly as the pre-precipitation of lime compounds by pre-mixing lime with weak ammonia liquor.

While the pre-distillation liming process of the present invention has been described in terms of specific apparatus, it will be understood that various alternative apparatus and arrangements may be used.

We claim:
1. An improved method of distilling weak ammonia liquor containing both free and fixed ammonia derived from a coal coking operation with decreased fouling of the still apparatus comprising:
(a) premixing ammonia liquor which contains both substantial free ammonia as ammonium carbonate, ammonium sulfide and ammonium cyanide and fixed ammonia as ammonium chloride, ammonium thiocyanate and ammonium sulfate prior to initiating any distillation with sufficient lime to pre-precipitate at least most of the principal components of precipitation fouling from the undistilled weak ammonia liquor, and
(b) passing the ammonia liquor subsequent to pre-precipitation with said lime through an ammonia still countercurrently with steam to distill the ammonia liquor and release ammonia from the liquor.

2. The improved method according to claim 1 wherein sufficient lime is premixed with the ammonia liquor to pre-precipitate both substantially all of the precipitatable lime compounds from the undistilled ammonia liquor and to free the fixed ammonia content of the liquor.

3. The improved method according to claim 2 wherein the weak ammonia liquor is passed through a single direct contact steam distillation operation.

4. The improved method according to claim 3 in which the ammonia still through which the ammonia liquor is passed has a range of molar liquid to gas ratios of approximately 5 to 10.

5. The improved method according to claim 4 in which the ammonia still through which the ammonia liquor is passed has a range of molar liquid to gas ratios of approximately 6 to 9.

6. The improved method according to claim 5 in which the ammonia liquor passed to the still subsequent to pre-precipitation with said lime has a pH value which is within a range of 10.6 to 11.0.

7. The improved method according to claim 5 wherein the lime is combined with the weak ammonia liquor as a milk of lime suspension.

8. An improved method of distilling weak ammonia liquor derived from a coal coking operation to remove both free and fixed ammonia from the liquor with minimal precipitation fouling of the still apparatus comprising: (a) premixing the ammonia liquor which contains both free and fixed ammonia in the form of the free ammonia compounds ammonium carbonate, ammonium sulfide and ammonium cyanide and in the form of fixed ammonia compounds ammonium chloride, ammonium thiocyanate and ammonium sulfate prior to initiating any distillation with a calcium ion containing material to pre-precipitate calcium components of precipitation fouling from the undistilled weak ammonia liquor, sufficient calcium material being added to the liquor to free substantial fixed ammonia in addition to pre-precipitating calcium components of precipitation fouling, and
  (b) passing the pre-precipitated ammonia liquor subsequent to premixing with the calcium ion containing material through an ammonia distillation operation countercurrently with steam to distill the ammonia liquor and expel ammonia from the liquor.

9. An improved method of removing free and fixed ammonia from weak ammonia liquor according to claim 8 wherein sufficient calcium ion containing material is premixed with the weak ammonia liquor to both pre-precipitate substantialy all precipitatable calcium components of precipitation fouling from the weak ammonia liquor and to free substantially all the fixed ammonia from the weak ammonia liquor whereby said free ammonia can be expelled from the weak ammonia liquor by distillation.

10. An improved method of removing free and fixed ammonia from weak ammonia liquor according to claim 9 wherein the weak ammonia liquor after pre-mixing with the calcium ion containing material is passed through a single direct contact steam distillation operation.

11. An improved method of removing free and fixed ammonia from weak ammonia liquor according to claim 10 wherein the ammonia still through which the ammonia liquor is passed has a range of molar liquid to gas ratios of approximately 5 to 10.

12. An improved method of removing free and fixed ammonia from weak ammonia liquor according to claim 11 wherein the ammonia still through the ammonia liquor is passed has a range of molar liquid to gas ratios of approximately 6 to 9.

13. An improved method of removing free and fixed ammonia from weak ammonia liquor according to claim 12 wherein the ammonia liquor passed to the still subsequent to pre-precipitation with said calcium ion containing material has a pH value which is within a range of 10.6 to 11.0.

14. A method of alleviating deleterious fouling of a still column with solid calcium compounds during distillation of weak ammonia liquor containing both free and fixed ammonia and including in particular carbonates and fluorides derived from a coal coking operation comprising:
  (a) premixing the weak ammonia liquor which contains both substantial free ammonia as the compounds ammonium carbonate, ammonium sulfide and ammonium cyanide and fixed ammonia as the compounds ammonium chloride, ammonium thiocyanate and ammonium sulfate prior to initiating any distillation with sufficient lime to pre-precipitatable calcium fluoride and calcium carbonate and reduce the fluoride ion concentration in the weak ammonia liquor to a point where no substantial calcium fluoride salts will precipitate during distllation, and
  (b) passing the weak ammonia liquor subsequent to said pre-precipitation through an ammonia distillation operation counter-currently with steam to distill the ammonia liquor and expel ammonia from the liquor.

15. A method of alleviating fouling of a still column according to claim 14 wherein sufficient lime is premixed with the weak ammonia liquor to pre-precipitate both calcium fluoride and calcium carbonate and reduce the fluoride and carbonate ion concentration in the weak ammonia liquor to a point where no substantial calcium fluoride or calcium carbonate salts will precipitate during distillation.

16. A method of alleviating fouling of a still column according to claim 15 wherein sufficient lime is premixed with the weak ammonia liquor to pre-precipitate substantially all precipitatable calcium compounds from the weak ammonia liquor.

17. A method of alleviating fouling of a still column according to claim 16 wherein sufficient lime is premixed with the weak ammonia liquor to pre-precipitate all precipitatable calcium compounds from the weak ammonia liquor and to free substantially all fixed ammonia in the ammonia liquor.

18. The improved method according to claim 1 wherein sufficient lime is premixed with the ammonia liquor to precipitate substantially all of the precipitatable lime compounds from the undistlled ammonia liquor.

* * * * *

UNITED STATES PATENT OFFICE
CERTIFICATE OF CORRECTION

Patent No. 4,108,735           Dated August 22, 1978

Inventor(s) Kenneth R. Burcaw, Jr. et al.

It is certified that error appears in the above-identified patent and that said Letters Patent are hereby corrected as shown below:

Col. 1, line 46, "stream" should read --steam--.

Col. 4, line 23, "ammonis" should read --ammonia--.

Col. 5, line 63, "lage" should read --large--.

Col. 6, line 3, "stream" should read --steam--.

Col. 7, line 14, "aditator" should read --agitator--.

Col. 7, line 42, "travere" should read --traverse--.

Col. 9, line 17, "as" should read --was--.

Col. 10, line 8, between "be" and "of" insert --one--.

Col. 10, line 9, "tye" should read --type--.

UNITED STATES PATENT OFFICE
CERTIFICATE OF CORRECTION

Patent No. 4,108,735　　　　　　　　　　Dated August 22, 1978

Inventor(s) Kenneth R. Burcaw, Jr. et al.

It is certified that error appears in the above-identified patent and that said Letters Patent are hereby corrected as shown below:

Col. 10, line 58, "WA1-MOL" should read --WAL-MOL--.

Col. 10, line 68, "whilfe" should read --while--.

ol. 11, line 33, "of a trial" should read --of trial--.

Col. 13, line 56, "through the ammonia" should read --through which the ammonia--.

Signed and Sealed this

Tenth Day of April 1979

[SEAL]

Attest:

RUTH C. MASON  
Attesting Officer

DONALD W. BANNER  
Commissioner of Patents and Trademarks